W. M. SHEEHAN.
LOCOMOTIVE TRUCK AND CRADLE FRAME.
APPLICATION FILED MAY 13, 1921.
1,410,962. Patented Mar. 28, 1922.
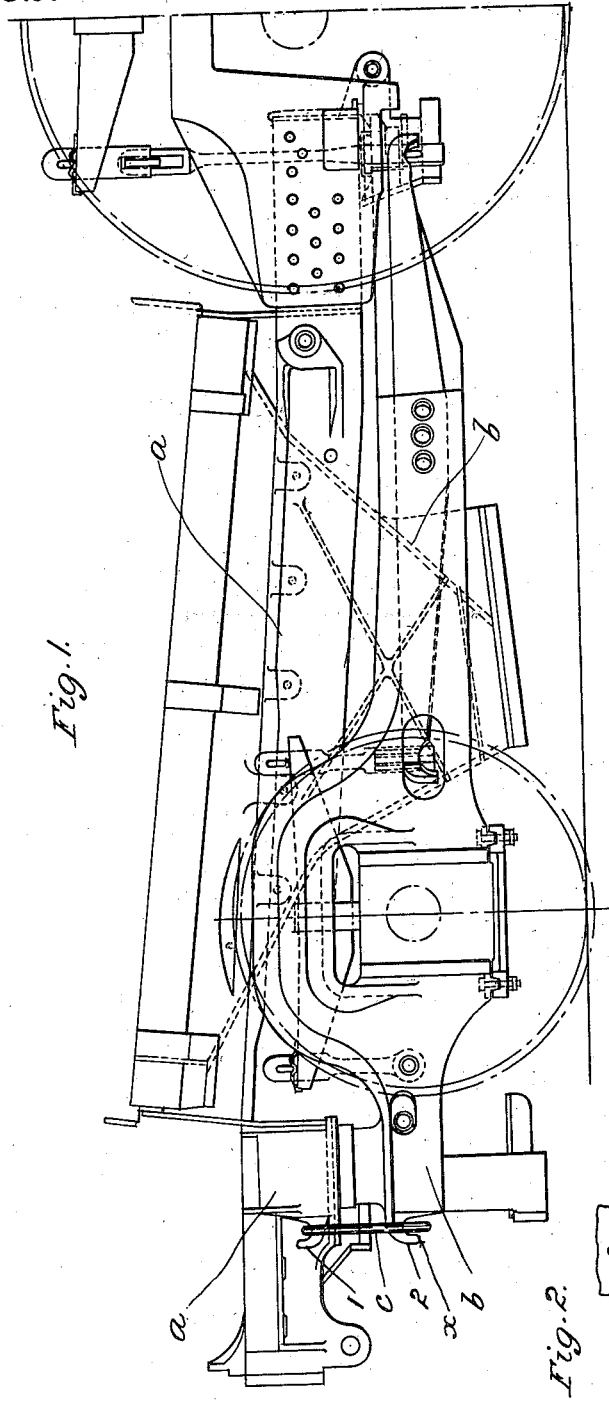
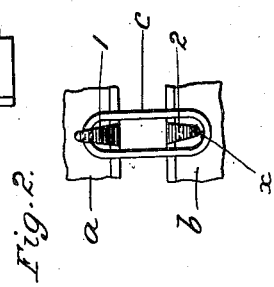
INVENTOR
William M. Sheehan
By Edward W. Furrell
Atty

UNITED STATES PATENT OFFICE.

WILLIAM M. SHEEHAN, OF ST. LOUIS, MISSOURI, ASSIGNOR TO COMMONWEALTH STEEL COMPANY, OF ST. LOUIS, MISSOURI, A CORPORATION OF NEW JERSEY.

LOCOMOTIVE TRUCK AND CRADLE FRAME.

1,410,962.   Specification of Letters Patent.   Patented Mar. 28, 1922.

Application filed May 13, 1921. Serial No. 469,239.

*To all whom it may concern:*

Be it known that I, WILLIAM M. SHEEHAN, a citizen of the United States, residing at St. Louis, in the State of Missouri, have invented a new and useful Improvement in Locomotive Truck and Cradle Frames, of which the following is a specification.

My invention relates particularly to the trailer truck and cradle frames of a locomotive, and has for its object to facilitate the removal and replacement of the wheels, springs and axle-boxes of a locomotive trailer truck.

It consists in features of novelty as hereinafter described and claimed, reference being had to the accompanying drawing forming part of this specification, whereon, Figure 1, is a side elevation of a locomotive trailer truck and cradle in their normal assembled position and showing my invention applied thereto, and Fig. 2, a side view of the link forming part of my invention.

Like letters and numerals of reference denote like parts in both figures.

In carrying out my invention I form or attach to the cradle frame $a$, preferably at or adjacent to its rear end, and preferably on each side of its longitudinal center, an outwardly projecting preferably, hook-shaped lug 1 which may be either integral with the body of the frame $a$ as shown, or fixed thereto by rivets, bolts, or otherwise as found most suitable, and on the trailer truck frame $b$, beneath, and in line or thereabout with the lug 1, I form or attach an inverted similarly shaped lug 2. Or if desired the lugs 1 and 2 may be otherwise shaped and located about the frames $a$ and $b$.

Assuming the cradle and trailer truck to be in their normal assembled position as shown in Fig. 1, and it being desired to remove the wheels and their appendages from the trailer truck, the cradle frame $a$ is coupled to the trailer truck frame $b$, preferably by a link $c$ the upper end of which is passed on to the hook-shaped lug 1 of the cradle frame $a$ and, depending therefrom, is swung under the inverted hook-shaped lug 2 of the trailer truck frame $b$, so that when the cradle is raised, the lower end of the link $c$ engaging the lug 2, will raise the trailer truck with the cradle and thereby enable the wheels and other parts of the trailer truck to be removed freely and quickly therefrom.

It is here noted in this connection that, the inner length of the link $c$ is somewhat greater than the distance between its upper end and the extremity $x$ of the hooked portion of the lug 2 when the cradle and trailer truck are in their normal assembled position, so that the lower end of the link $c$, when adjusted for engaging the lug 2, will clear the hooked portion of the latter, whereby a small amount of play will occur between the cradle and trailer truck when raised as described.

I do not limit myself to the use of the link $c$ for connecting the lugs 1 and 2, as it is obvious that other means may be used for the purpose, such as, a chain, an S-shaped hook, or analogous device.

I claim:

1. In a locomotive, a cradle frame, a trailer truck frame, and vertically aligned hooks on said frames respectively facing in opposite directions.

2. In a locomotive, a cradle frame, a trailer truck frame, vertically aligned hooks on said frames respectively facing in opposite directions, and means adapted to engage said hooks to limit opposite vertical movement of said frames.

3. In a locomotive, a cradle frame, a trailer truck frame, and a projection on each of said frames, said projections being aligned vertically and adapted to engage a connecting element.

4. In a locomotive, a cast cradle frame, a cast trailer truck frame, and integral projections on each of said frames, said projections being aligned vertically and adapted to be engaged by a connecting element.

5. In a locomotive, a trailer truck frame, a horizontal projection thereon adapted to extend beneath the rear end of a cradle frame, and an integral downwardly facing hook on said projection.

6. In a locomotive, a cradle frame, a horizontal projection thereon adapted to extend over a trailer truck frame, and an integral upwardly facing hook on said projection.

WILLIAM M. SHEEHAN.